US006418310B1

(12) United States Patent
Dent

(10) Patent No.: US 6,418,310 B1
(45) Date of Patent: Jul. 9, 2002

(54) WIRELESS SUBSCRIBER TERMINAL USING JAVA CONTROL CODE

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/368,663

(22) Filed: Aug. 5, 1999

(51) Int. Cl.$^7$ .............................. H04M 3/00; H04M 1/00
(52) U.S. Cl. ........................ 455/418; 455/550; 455/566; 455/517; 345/749
(58) Field of Search ................................. 455/426, 418, 455/419, 420, 550, 566, 517; 709/219, 328; 345/749

(56) References Cited

U.S. PATENT DOCUMENTS

| | | | |
|---|---|---|---|
| 6,021,469 A | * | 2/2000 | Tremblay et al. ............ 711/125 |
| 6,034,963 A | * | 3/2000 | Minami et al. .............. 709/230 |
| 6,084,951 A | * | 7/2000 | Smith et al. .............. 379/93.17 |
| 6,138,009 A | * | 10/2000 | Birgerson .................... 455/419 |
| 6,167,253 A | * | 12/2000 | Farris et al. ................. 455/414 |
| 6,226,367 B1 | * | 5/2001 | Smith et al. ............ 379/142.04 |
| 6,269,254 B1 | * | 7/2001 | Mathis ........................ 455/557 |
| 6,295,289 B1 | * | 9/2001 | Ionescu et al. .............. 455/522 |
| 6,310,610 B1 | * | 10/2001 | Beaton et al. ............... 345/173 |
| 2001/0032254 A1 | * | 10/2001 | Hawkins ...................... 709/219 |

FOREIGN PATENT DOCUMENTS

| | | | |
|---|---|---|---|
| EP | 0853413 | 7/1998 | ............ H04L/29/06 |
| EP | 0869691 | 10/1998 | ............ H04Q/7/32 |
| EP | 0930793 | 7/1999 | ............ H04Q/7/32 |
| WO | 99/06910 | 2/1999 | ............ G06F/9/445 |

OTHER PUBLICATIONS

McGhan, Harlan and O'Connor, Mike; PicoJava: A Direct Execution Engine for Java Bytecode; IEEE, Oct. 1998, pp. 22–30.

"Sun Unveils its First Java Processor microJava701 Looks to Post Industry's Highest Caffeinemarks," www.sun.com, Aug. 9, 1999, pp. 1–3.

* cited by examiner

Primary Examiner—William Trost
Assistant Examiner—Rafael Perez-Gutierrez
(74) Attorney, Agent, or Firm—Coats & Bennett, P.L.L.C.

(57) ABSTRACT

A portable wireless communications device is largely controlled in its internal operation and in its interaction with the mobile phone network by a ROM-stored control program written in the JAVA language. The wireless communications device includes a transmitter and a receiver for communicating data via a wireless network control station via radiowaves, a man-machine interface (MMI) for displaying information to the human user and providing interaction with the human user, and a control processor for controlling interaction between the MMI, the operation of the transmitter, the operation of the receiver, and the wireless network station. The control processor is controlled by a stored control program comprising ROM-stored JAVA bytecodes that are interpretively executed by a ROM-stored JAVA interpreter.

20 Claims, 3 Drawing Sheets

WIRELESS SUBSCRIBER TERMINAL USING JAVA CONTROL CODE

FIELD OF THE INVENTION

The present invention relates to the field of portable wireless communications devices, and more particularly to the control of such devices through the use of control programs written in an interpretive language, such as the JAVA language.

BACKGROUND OF THE INVENTION

A portable wireless communications device, such as a cellular mobile phone, of the prior art typically includes a transmitter, a receiver, a man-machine interface, and a software control program. The transmitter and receiver exchange coded voice or data with a wireless network station, such as a common cellular base station. The man-machine interface (MMI) interacts with the human user and typically includes a keyboard and display. The software control program runs on an embedded control processor and controls the interactions between the human user, the MMI, the transmitter, the receiver and the wireless network. In the prior art, this software control program is written in a language such as "C" mixed with native Assembly Code which is compiled and linked to produce native machine code instructions for the device's processor to execute directly. The use of the mixture of compiled C and native assembler for mobile phone control programs is due to the fact that code efficiency in terms of memory occupancy, speed, and power consumption of the processor is critical in low-cost, battery-operated equipment.

The JAVA language has been promoted by SUN Microsystems as a platform-independent language. The platform-independence of the JAVA language is provided by it being an interpreted language, that is, JAVA does not compile to produce native machine code for any particular processor, but to produce JAVA bytecodes. JAVA bytecodes are a compressed representation of the original, human-readable source code. The JAVA bytecodes are standardized according to a public specification such as that given in Chapter 6 of "The JAVA Virtual Machine Specification—Second Edition" by Tim Lindholm and Frank Yeddin and can be interpreted by any processor that is equipped with a JAVA interpreter. The combination of the JAVA interpreter and the processor is known as a JAVA Virtual Machine (JVM). The advantage of an interpreted language such as JAVA is that the compiled program consisting of JAVA bytecodes theoretically does not need to be recompiled to run on a different processor, as all JVMs theoretically behave equivalently if they correctly implement the JAVA standard.

JAVA language has not been used for mobile phone control programs due to the need for efficiency in terms of memory occupancy, speed, and power consumption of the processor that are critical in low-cost, battery-operated equipment. These goals are not met by writing control software in JAVA due to the significant size of the JVM interpreter for executing JAVA bytecodes. Further, it is well known that interpretive languages generally execute less efficiently than native machine code programs. Thus, several considerations present in the prior art counsel against the use of JAVA for the intimate control software of a mobile phone and rather suggest that the present approach using a mixture of compiled C and native Assembler is best suited to the task.

In contrast to mobile phones, it was known in the prior art that portable computers products, such as laptop computers, notebook computers, and Personal Digital Assistants (PDAs), may contain a JAVA Virtual Machine for executing software available from third parties, or programs embedded within hypertext documents that are dynamically downloaded from the Internet. Software that is dynamically downloaded must of course be stored during execution in Random Access Memory (RAM) as opposed to the Read-Only Memory (ROM). Thus, in the prior art usage of JAVA for downloaded programs from third parties, the JAVA program had to be downloaded into RAM. However, at the present state of the art, ROM occupies 1/10th of the chip area needed for RAM and is therefore much more cost effective for storing fixed control programs, such as the control programs for a mobile phone. Therefore, the control programs of prior art mobile phones are typically stored in ROM.

Some portable computers may be equipped with wireless communications devices, such as mobile phones constructed in PCMCIA plug-in card format, to allow communications between the portable computer and the Internet while on the move. Other computers may be connected by cable or short-range wireless link, such as an infrared link, to a conventional handheld mobile phone for a similar purpose. For the reasons listed above however, such wireless communications devices in the prior art include their own, ROM-stored control programs written in traditional languages and not JAVA.

Thus, none of the prior art discloses or suggests the use of an interpretive language such as JAVA as the language for wireless communications device control programs.

SUMMARY OF THE INVENTION

The present invention provides a portable wireless communications device that is largely controlled in its internal operation and in its interaction with the mobile phone network by a ROM-stored control program written in an interpreted language, such as the JAVA language.

In a preferred embodiment, the wireless communications device includes a transmitter and a receiver for communicating data via a wireless network control station via radiowaves, a man-machine interface (MMI) for displaying information to the human user and providing interaction with the human user, and a control processor for controlling interaction between the MMI, the operation of the transmitter, the operation of the receiver, and the wireless network station. The control processor is controlled by a stored control program comprising ROM-stored JAVA bytecodes that are interpretively executed by a ROM-stored JAVA interpreter. The JAVA interpreter may optionally be used when required to interpret RAM-stored JAVA bytecodes that are received from the network station, for example embedded within a hypertext document conveyed over the Internet.

Using a mobile phone as an example of a portable wireless communications device, a typical control function provided by the JAVA control program is to process a channel allocation message received from the wireless control station as a response to a mobile- or network-initiated call. A channel-allocation message may for example include information about the radio frequency channel on which further communications are to continue, a timeslot within a repetitive Time-Division Multiple Access frame period on which communications are to continue, a Code-Division Multiple Access spreading code to be used, and/or an indication whether or not communications over the wireless link should use wireless link encryption. Other examples of control messages passed between the network station and the mobile phone over the wireless link include a handoff message which informs the mobile phone to transfer from communicating with the network station currently used to communicating with a different network station which the mobile phone is approaching; an authentication request in which either the mobile phone or the network can send a message containing an authentication challenge to the other party and the other party must reply with an authentication response based on secret information that only genuine parties would have in common; and the Mobile Assisted Handover (MAHO) message in which the network informs the mobile phone of the frequencies of surrounding networks stations that shall be scanned for the purposed of making signal strength measurements, and which the mobile sends to the network to report such measurements. The collection of all such control messages that may be exchanged between the mobile phone and the network, largely in a fashion unknown to the human operator, is known as Layer-3 Signaling. The invention thus utilizes a control program for handling layer-3 signaling exchanged between the network and the mobile phone and for controlling the behavior of the mobile phone in response to such messages.

Beneficially, the control program of JAVA bytecodes is interpreted by a JAVA interpreter that is already present in the mobile phone for reasons not associated with communications network control, but instead for providing interaction between the human user and the Internet.

DETAILED DESCRIPTION OF AN EMBODIMENT

Figure 1:
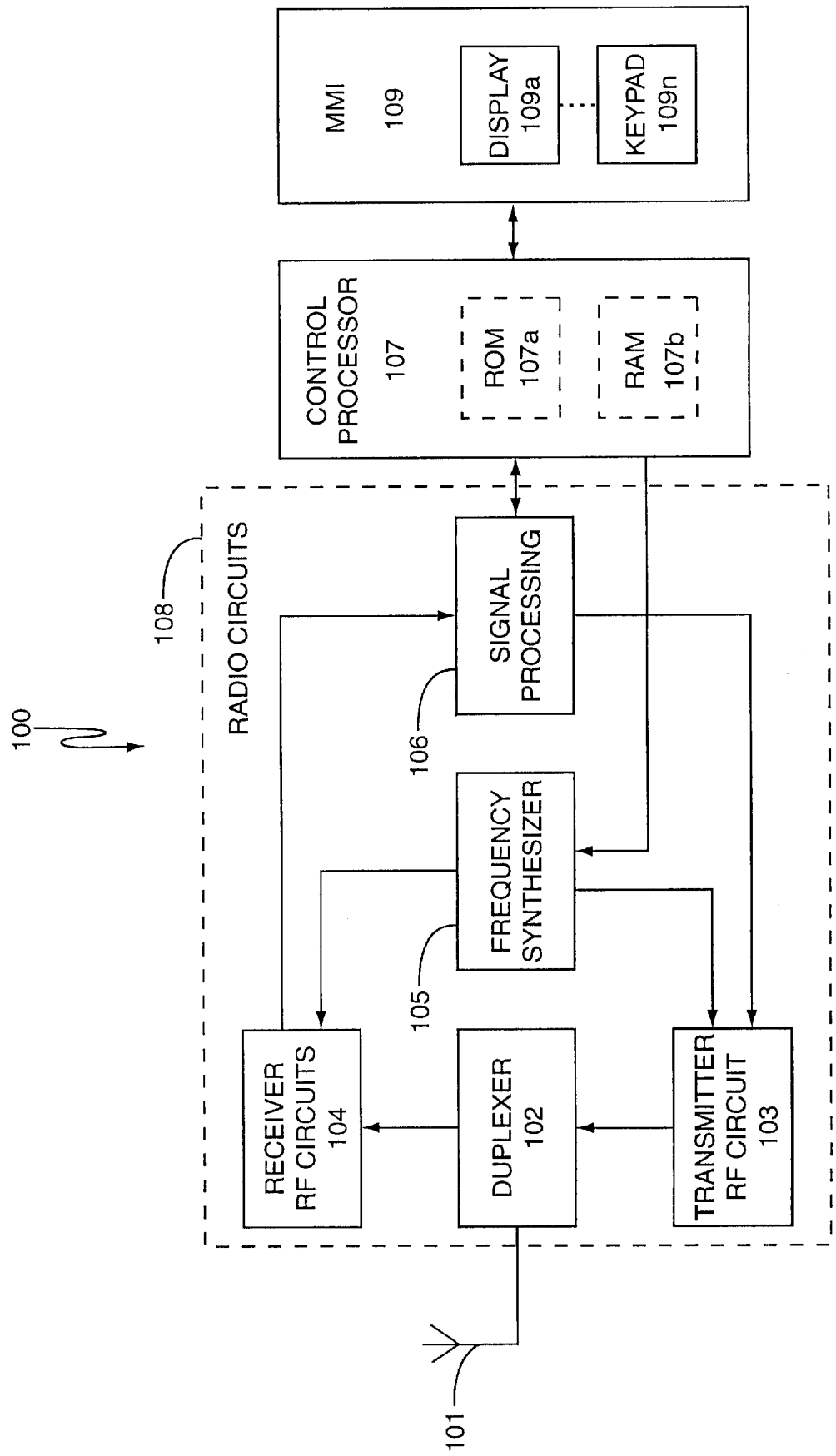
FIG. 1 is a block diagram of a wireless communications device of the prior art.

FIG. 1 shows the block diagram of a portable wireless telephone 100 of the prior art. Signals are received at antenna 101 which is connected to receiver RF circuits 104 and transmitter RF circuit 103 via a duplexer 102. A duplexer 102 is used when simultaneous operation of the transmitter 103 and the receiver 104 is required; alternatively, a simple transmit/receiver switch may be used. When a switch is used, it should be controlled by means of control processor 107 to connect the antenna 101 to the transmitter 103 during periods of transmission and left in receive mode, or an "off" mode, at other times.

Receiver circuits 104 condition the received signal for further numerical processing, by, for example, filtering and amplifying signals in the receive frequency band; tuning a frequency synthesizer 105 under control of control processor 107 to produce a local oscillator signal at a desired local oscillator frequency; mixing the filtered and amplified received signals with the local oscillator signal in a down-converting mixer to produce an intermediate frequency (IF) signal; amplifying the IF signal and filtering it using an IF filter to select a single channel frequency signal, and analog-to-digital converting the filtered IF signal to produce a stream of complex numbers representative of an information-modulated signal. For example, the logpolar technique of U.S. Pat. No. 5,048,059 may be used to produce the stream of complex numbers in logpolar format, or alternatively an improved homodyne receiver may be used, as described in U.S. Pat. Nos. 5,241,702, 5,568,520 and 5,712,637, all of which are hereby incorporated by reference herein.

The complex sample stream produced by the receiver circuits 104 is processed by digital signal processing circuits 106 to demodulate and decode information. The decoded information may be user data, for example digitized speech signals, or alternatively FAX or computer data. The computer data may for example be information sent from an internet server contacted in the course of the user browsing the internet using an attached net-browsing computer not shown in FIG. 1. In the prior art, user data was passed out of the wireless telephone block diagram of FIG. 1 towards the appropriate destination. For instance, speech signals may be routed to output components, such as a ringer, a speaker, an earphone, or the like. Computer or fax data on the other hand is passed to a fax machine or computer via appropriate input/output ports.

The information decoded by signal processing circuits 106 may instead be control messages passed between the network and the mobile phone using a special signaling channel protocol. These signal channels may be of any type known in the art, such as the Slow Associated Control Channel (SACCH); the Fast Associated Control Channel (FACCH); the paging channel (PCH) or broadcast control channel (BCH), or the Dedicated control channel (DCCH) which is used in the GSM system in particular. All such control channel or signaling information, collectively "control messages," are passed from signal processing circuits 106 to control processor 107 when detected. The control processor 107 implements the signaling protocol aspects such as Acknowledgement of packets, Automatic Retransmit Request (ARQ) and the like. Control processor 107 also interprets control messages by partitioning the control messages into their various bit-fields and initiating action within the mobile phone according to the bit-values within the bit-fields. Associated with the control processor 107 are Read-Only memory (ROM) 107a and Random Access Memory (RAM) 107b. In FIG. 1, ROM 107a and RAM 107b are shown integral parts of processor 107, but they may also be separate components. The ROM 107a, for example a FLASH memory, contains program instructions written in or compiled to the native machine code of the control processor 107. RAM 107b is used for workspace and temporary variables.

For most of the signaling channels, the wireless phone knows when the received signal comprises signaling information due to the state of connection that the device is in, e.g. idle (reading the PCH/BCH waiting to be called); off-hook waiting for a traffic channel assignment; or else SACCH which is transmitted in specific bit-fields or timeslots of the digital information transmission that are distinct from user data bit-fields or timeslots. For example, in the digital cellular system known as GSM, SACCH messages are transmitted using an assigned timeslot on every 26th TDMA frame period, while in the digital cellular system known as D-AMPS or ANSI-136, SACCH messages are sent using the first six data symbol positions in every TDMA timeslot. Typically, only the FACCH signaling channel is sent in a manner that requires special means to discriminate it from user data. FACCH messages are urgent messages that are transmitted by stealing temporarily the capacity that would otherwise be allocated to user data. In the aforementioned GSM system, FACCH is indicated by including a "stealing flag" bit in association with each half of each timeslot, so that half-slots may be assembled and further processed according as they contain user data or FACCH messages. Alternatively, for systems such as D-AMPS/ANSI-136 that do not transmit stealing flags, the invention of U.S. Pat. No. 5,230,003, incorporated herein by reference, may be used to discriminate FACCH from user data according to the type of coding used.

Figure 2:
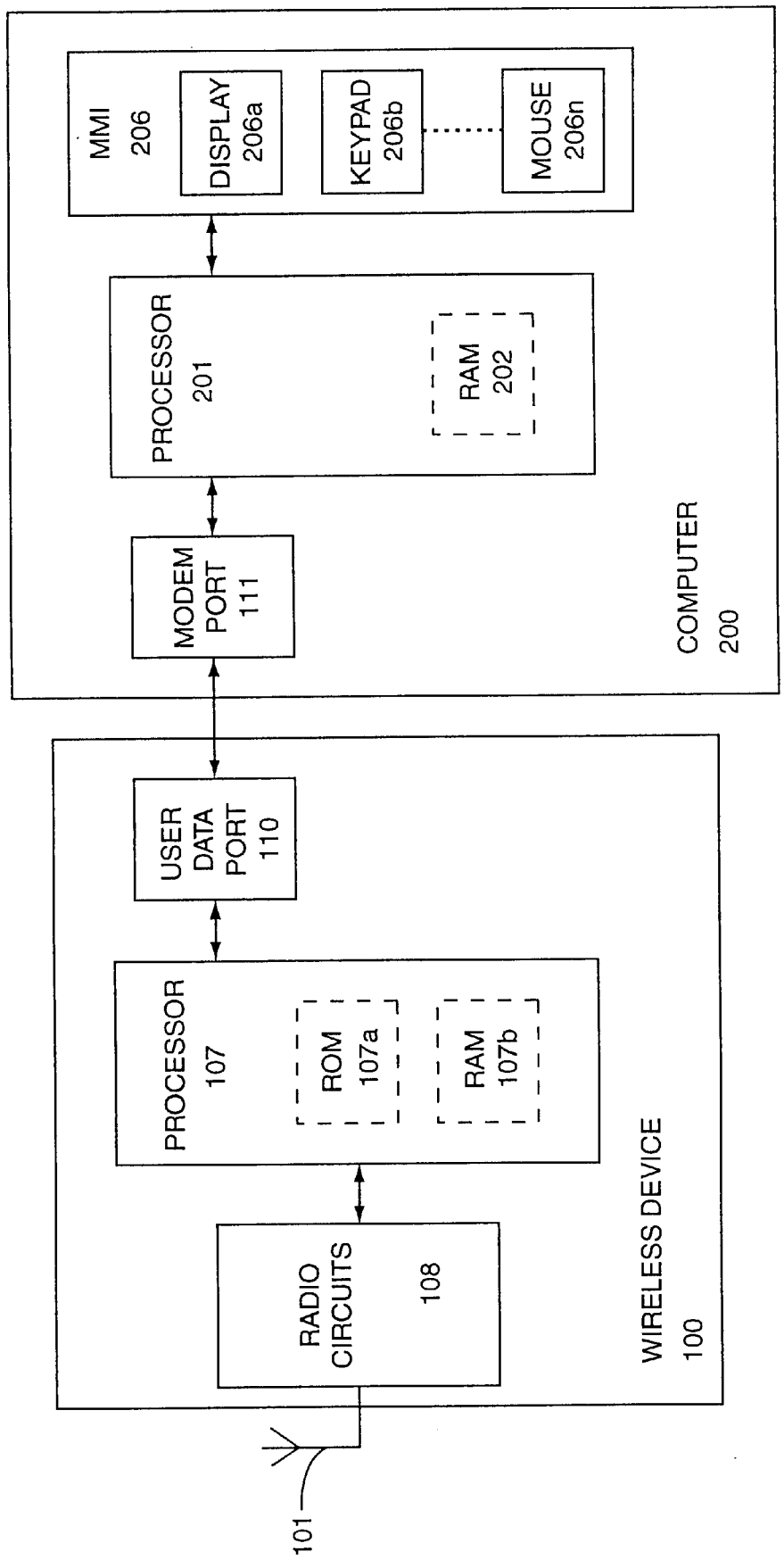
FIG. 2 is a block diagram of a wireless net-browsing configuration of the prior art.

FIG. 2 illustrates how, in the prior art, a wireless communications device 100 of FIG. 1 could be connected to a computer 200 to achieve "wireless net-browsing". Such a wireless communications device 100, which may be a cellular phone with data as well as voice modes, could be connected to or built in to a computer device 200, such as a personal computer. The computer 200 of the prior art includes another processor 201, which could most often be an Intel microprocessor, such as the microprocessor sold under the tradename "Pentium". The memory 202 connected to processor 201 is dominantly RAM which enables the computer 200 to be loaded with various programs from various long-term sources, such as a disk, from time to time. When used for net-browsing, RAM 202 would be loaded with modem software drivers, browser software, and various JAVA bytecodes, or JAVASCRIPT instructions received from the Internet embedded within various web-based documents. The modem software would help control communication with the external world through modem port 111. The browser software includes a JAVA interpreter for interpreting JAVA source code, JAVA bytecodes, or JAVASCRIPT instructions received from the Internet embedded within various web-based documents. Examples of browser software include Microsoft's Internet Explorer or Netscape's Navigator, both of which have their own implementations of a Java Virtual Machine. In the prior art, the JVM would also be loaded into RAM when the browser was loaded, or brought in from disc as needed by dynamic memory management implemented in an operating system. The web-browser would communicate via the modem software and modem port 111 with a user data port 110 on the wireless communications device 100 to send or receive data by radio means via a cellular network base station to the Internet. When data received via the wireless communications device 100 from the Internet contained JAVA code of any sort, it would be routed transparently through the wireless communications device 100 to the browser's JVM, where it would be interpreted to cause some action at the man-machine interface 206 associated with the computer 200. For example, the JAVA code would cause the display 206a to show a form to be filled in by the user, a picture, a graph, or an animated diagram. Further, the JAVA code may capture the user's data input (e.g., via a keyboard 206b or a mouse 206n) and process it or return it to the Internet for processing.

In the prior art, FIG. 2 was clearly divisible into a processor 107 relying predominantly on ROM memory 107a for handling wireless communications protocols on the one hand and a processor 201 relying predominantly on RAM memory 202 on the other. The phone processor 107 was transparent to received data containing JAVA and thus having no need of a JVM while the computer's processor 201 processed data containing JAVA code and thus needed a JVM. Therefore, there was no motivation to have a JVM in processor 107 at all, and thus no motivation to write the software for controlling the cellular device in JAVA.

Figure 3:
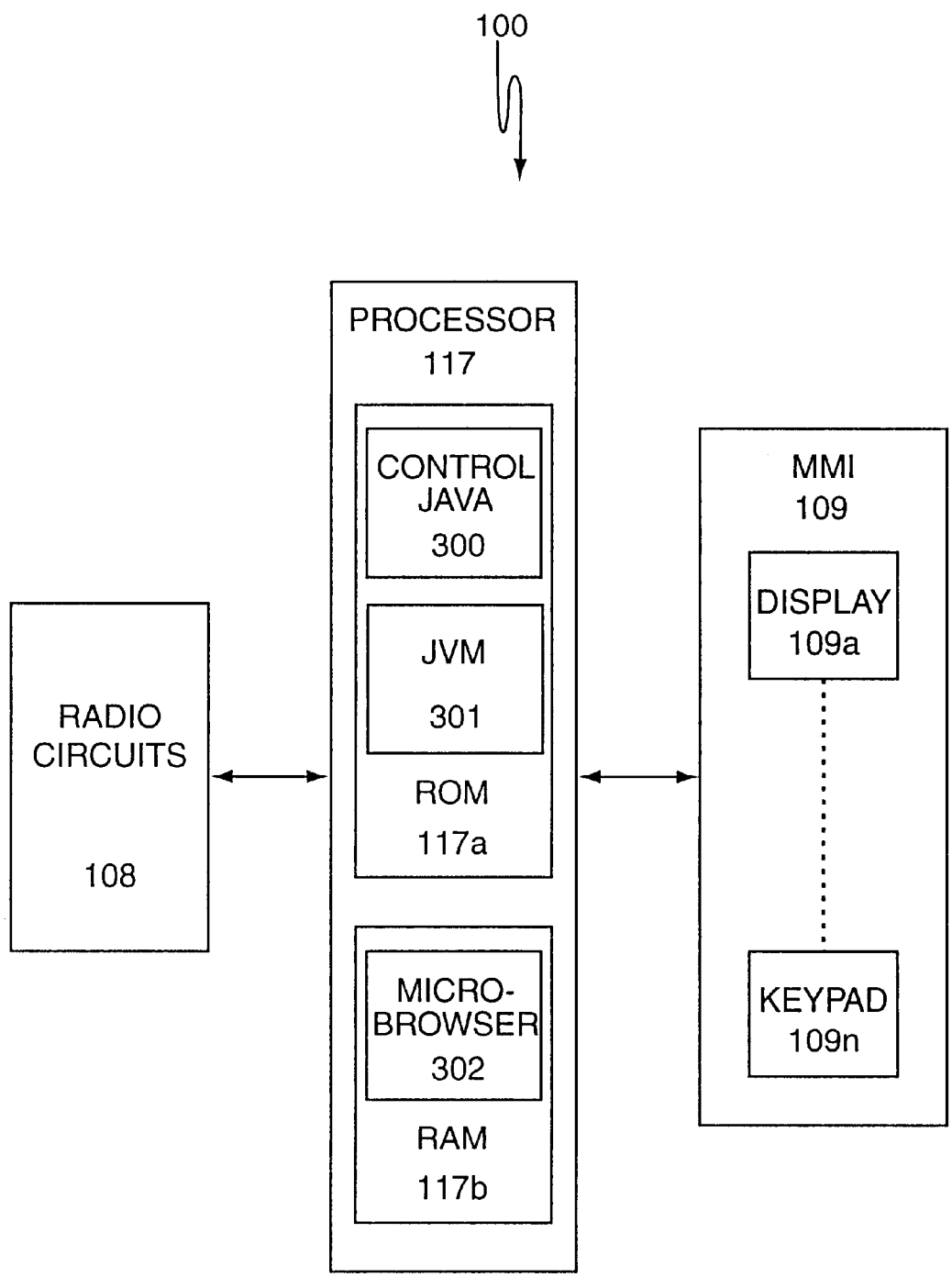
FIG. 3 is a block diagram of a wireless communications device according to the present invention.

FIG. 3 shows an improved cellular phone as an example of the improved wireless communications device 100 according to the invention. Radio circuits 108 are controlled by a processor 117 that performs the same general functions as processor 107 of FIG. 1, but in a different manner. In the invention, a substantial part of the software control program for processor 117 is written in JAVA source code and stored as JAVA bytecodes 300 in ROM 117a instead of being compiled to and stored in the form of native machine code. A JAVA Virtual Machine 301 written in or compiled to native machine code is also stored in ROM 117a and is used to interpret the JAVA bytecodes 300 in order to control radio circuits 108. For example, the JAVA Virtual Machine 301 may process received FACCH or SACCH messages, construct such messages for transmission, implement Mobility Management, Authentication and Access control, Handover or indeed any Layer-3 function defined in the air-interface standard. The JAVA Virtual Machine 301 should be adapted specifically to the form of Man-machine interface 109 available on the phone of FIG. 3.

In addition, either ROM 117a or RAM 117b should include a microbrowser 302. Microbrowser 302 is a form of net-browser software designed specifically for wireless devices having small displays, or limited communications speed, and may operate in conjunction with a cooperative program in the network side to filter, translate, compress or otherwise modify data from normal websites in order to achieve a useful display presentation to the user or to reduce transmission time.

Preferably, JAVA is also the source code for writing the software associated with the Man-Machine-Interface 109, for interpreting user keypresses on a keypad 109n and formatting information on the user display 109a during normal use as a telephone, for example.

The processor RAM memory 117b may receive and store data from the web containing JAVA in one form or another, which may then be passed by the micro-browser 302 to JVM 301 for interpretation. Thus, in the embodiment of FIG. 3, the JVM 301 serves two functions—interpreting ROM-stored communications-device control codes and alternatively interpreting RAM-stored JAVA received over the radio communications path from a website. Because of the necessity of the JVM for the latter function, its use for the former function does not impose any additional program storage overhead.

The discussion above has used an enhanced cellular telephone as an example of a wireless communications device 100; however, the present invention is not so limited. Instead, the wireless communications devices 100 incorporating the present invention may take a wide variety of forms, for example, personal digital assistants and the like. The wireless communications device 100 need only include suitable ROM (117a) for storing the JAVA based control program and an appropriate JVM for implementing those commands.

Thus, a portable wireless communications device 100 has been described above which advantageously allows its own control software 300 to be written in the JAVA language and stored as JAVA bytecodes, without the overhead of the prior art. The JAVA bytecodes may be substantially independent of the exact nature of the product and processor 117 chosen, thus allowing portability and software re-use across product ranges and product generations, reducing development time and cost for new products.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A portable wireless communications device, comprising:
   a) a radio transmitter, said transmitter selectively transmitting user information and control messages to a network station;
   b) a radio receiver, said receiver selectively receiving user information and control messages from said network station;
   c) a read only memory (ROM) having therein both a control program in JAVA language and a JAVA interpreter program for said JAVA language;
   d) a man-machine interface, said man-machine interface receiving input to the device from a user and providing output thereto;
   e) a control processor controlling the operation of said transmitter and said receiver in response to said control messages according to said control program as interpreted by said interpreter program; and
   f) wherein said man-machine interface operates under the control of said control processor according to said control program as interpreted by said interpreter program.

2. The device of claim 1 further including a random access memory; wherein said JAVA interpreter program stored in the ROM further interprets JAVA bytecodes received as part of said user information and stored temporarily in said random access memory from where it is retrieved for interpretation by said interpreter program in the ROM.

3. The device of claim 2 wherein said JAVA bytecodes received as part of said user information and stored temporarily in said random access memory control the interaction with the human user via said man-machine interface.

4. A method of controlling the communications operations of a portable wireless communications device, said wireless communications device including a read only memory (ROM) and a transmitter and exchanging control messages with a network station, and further including random access memory and a man-machine interface, said man-machine interface receiving input to the device from a user and providing output thereto, the method comprising:
   a) storing, in the ROM, a control program in JAVA, said control program controlling the overall communications operations of the transmitter;
   b) storing, in the ROM, an interpreter program for JAVA;
   c) thereafter, controlling the operation of said transmitter in response to said control messages according to said control program as interpreted by said interpreter program and operating said man-machine interface according to said control program as interpreted by said interpreter program.

5. The method of claim 4 further including using said interpreter program in the ROM to interpret JAVA bytecodes received from said network station and stored temporarily in said random access memory.

6. A method of controlling the communications operations of a portable wireless communications device, said wireless communications device including a read only memory (ROM) and a transmitter and exchanging control messages with a network station, the method comprising:
   a) storing in the ROM, a control program in an interpretive computer programming language, said control program controlling the overall communications operations of the transmitter;
   b) storing, in the ROM, an interpreter program for said interpretive computer programming language; and
   c) thereafter, controlling the operation of said transmitter in response to said control messages according to said control program as interpreted by said interpreter program.

7. The method of claim 6 wherein said wireless communications device further includes a random access memory and a man-machine interface, said man-machine interface receiving input to the device from a user and providing output thereto; wherein said interpretive computer programming language is JAVA and further including using said interpreter program in the ROM to interpret JAVA bytecodes received from said network station and stored temporarily in said random access memory.

8. The method of claim 7 wherein using said interpreter program in the ROM to interpret JAVA bytecodes received from said network station includes using said interpreter program in the ROM to interpret JAVA bytecodes received from said network station in order to control interaction with the human user via said man-machine interface.

9. The method of claim 6 wherein said wireless communications device further includes a man-machine interface, said man-machine interface receiving input to the device from a user and providing output thereto and further including operating said man-machine interface according to said control program as interpreted by said interpreter program.

10. The method of claim 6 wherein said control messages include at least one of a channel allocation message, a handoff message, an authentication challenge, or a channel scan list.

11. The method of claim 6 wherein said wireless communications device is a digital cellular telephone.

12. The method of claim 6 wherein said interpretive computer programming language is JAVA.

13. A portable wireless communications device, comprising:
   a) a radio transmitter, said transmitter selectively transmitting user information and control messages to a network station;
   b) a radio receiver, said receiver selectively receiving user information and control messages from said network station;
   c) a read only memory (ROM) having therein both a control program in an interpretive computer programming language and an interpreter program for said interpretive computer programming language; and
   d) a control processor controlling the operation of said transmitter and said receiver in response to said control messages according to said control program as interpreted by said interpreter program.

14. The device of claim 13 further including a random access memory and a man-machine interface, said man-machine interface receiving input to the device from a user and providing output thereto; wherein said interpretive computer programming language is JAVA and wherein said interpreter program in the ROM further interprets JAVA bytecodes received as part of said user information and stored temporarily in said random access memory from where it is retrieved for interpretation by said interpreter program in the ROM.

15. The device of claim 14 wherein said JAVA bytecodes received as part of said user information and stored temporarily in said random access memory control the interaction with the human user via said man-machine interface.

16. The device of claim 13 wherein said control messages include at least one of a channel allocation message, a handoff message, an authentication challenge, or a channel scan list.

17. The device of claim 13 further including a man-machine interface, said man-machine interface receiving input to the device from a user and providing output thereto.

18. The device of claim 17 wherein said man-machine interface operates under the control of said control processor according to said control program as interpreted by said interpreter program.

19. The device of claim 13 wherein said interpretive computer programming language is JAVA.

20. The device of claim 13 wherein said device is a portable cellular telephone.

* * * * *